United States Patent [19]
Gopal et al.

[11] 3,860,481
[45] Jan. 14, 1975

[54] METAL IMPACT MONITOR

[75] Inventors: Raj Gopal, Monroeville, Pa.; Marc F. M. Carteus, Montignies-le-Tilleul, Belgium

[73] Assignee: Westinghouse Electric Corporation, Pittsburgh, Pa.

[22] Filed: Jan. 29, 1973

[21] Appl. No.: 327,539

[52] U.S. Cl.................. 176/19 R, 73/67.2, 73/71.4
[51] Int. Cl............................................. C21c 17/00
[58] Field of Search........... 176/19 R; 73/67.2, 71.2, 73/71.4

[56] References Cited
UNITED STATES PATENTS

| | | | |
|---|---|---|---|
| 3,106,092 | 10/1963 | Shapiro | 73/71.2 |
| 3,292,426 | 12/1966 | McCann | 73/71.4 |
| 3,534,589 | 10/1970 | Gibbons et al. | 73/71.4 |
| 3,550,434 | 12/1970 | Sohoel | 73/67.2 |
| 3,554,012 | 1/1971 | Schroeder | 73/67.2 |

Primary Examiner—Harvey E. Behrend
Attorney, Agent, or Firm—D. C. Abeles

[57] ABSTRACT

A system is disclosed which employs the energy imparted to a metal specimen by impact to detect both the rate and energy with which impacts occur. The impact energy is detected by a sensor, at the resonant frequency of a metal specimen, which provides an output representative thereof. The output of the sensor is processed to provide a first and second signal respectively corresponding to the rate and energy with which impacts occur. The energy of each impact is transformed into a pulsed output having an amplitude proportional to the impact energy level. A bandpass filter further refines the system to pass only those signals within the frequency range characteristic of metal impact; thus eliminating background noise which might otherwise obscure the impact response. Additional peak detecting means associated with the second signal provides an indication of the maximum impact energy sustained by the metal specimen over a predetermined period of time.

6 Claims, 5 Drawing Figures

METAL IMPACT MONITOR

BACKGROUND OF THE INVENTION

This invention pertains in general to metal vibration monitors and more specifically to a metal impact monitor that monitors the impact energy imparted to a metal specimen at the resonant frequency of the specimen to provide an output indicative of both the rate and energy at which impacts occur.

It is desirable in the operation of pressurized water reactor power generating stations to have a system which will enable the early detection and survey of the failure of primary system components. Early detection of component failures will prevent the manifestation of dangerous operating conditions which might otherwise occur during prolonged operation under such circumstances. The failure of such mechanical components characteristically results in metal debris which concentrate in the steam generator inlet plenum and the bottom plenum of the reactor vessel. Those locations are the most probable collection points and as such are most suitable for the detection of debris. The debris, are transported to collection points by the normal flow of the primary coolant and are propelled during their course of travel against the metal walls enclosing the primary system coolant paths. Accordingly, surveillance of the energy imparted to the metal walls as a result of such impacts will provide an indication of primary system component failure.

A system which has been employed in the past for an analogous application to detect the mechanical state of a machine is described and illustrated in the patent to E. O. Sohoel, U.S. Pat. No. 3,554,012, issued Jan. 12, 1971. The system thus described converts the mechanical vibrations occurring within the machine into analogous electrical vibrations by means of a pickup, and analyzes the output electrical oscillations. During the conversion, initial shock waves radiate from the point of impact and create mechanical transients in the measuring system. This device utilizes the transient response at the resonant frequency of the transducer rather than the initial shock response for excitation of the transducer to obtain the output parameters. The resultant response is a continuous oscillation of relatively low amplitudes at the resonant frequency of the transducer and transients within this continuous oscillation are analyzed to obtain the desired outputs. As a result, the signal conditioning equipment designed to isolate the desired information is assigned the task of discriminating between relatively small amplitude levels; thus lowering the sensitivity of the systems response.

Accordingly, an improved metal impact monitor is desired that will provide discrete outputs indicative of the rate at which impacts occur, independent of their impact energy, and the impact energy of the individual impacts, independent of their rate.

SUMMARY OF THE INVENTION

Briefly, to satisfy the aforcited criteria, this invention provides a metal impact monitor for detecting the energy imparted to a metal specimen by impacts or shocks induced from a source external to the specimen. The monitor detects both the rate and energy level of such impacts at the resonant frequency of the metal specimen and is adaptable for use on line in an adverse operating environment to provide a continuous, real time, on line, record of impacts and shocks sustained by the specimen.

Thus, in accordance with this invention a sensor converts the mechanical energy imparted to the specimen by impacts, at the resonant frequency of the metal of which the specimen is constructed, into an analogous electrical signal. The electrical output of the sensor is processed to obtain a first signal representative of the rate at which impacts occur and a second signal corresponding to the impact energy level. Alternative means are also described for providing an indication of the maximum impact energy imparted to the metal specimen over a predetermined period of time.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

In accordance with this invention a system is provided which employs the energy imparted to a metal specimen by impacts or shocks induced from a source external to the specimen. To monitor such impacts, the external source can be any generative force which transfers energy to the specimen other than those normally encountered by the specimen. The system detects both the rate and energy level of such impacts at the resonant frequency of the metal specimen and is adaptable for use in the operating environment of the specimen to provide a continuous, real time, on line record of impacts and shocks sustained by the specimen.

Figure 1:
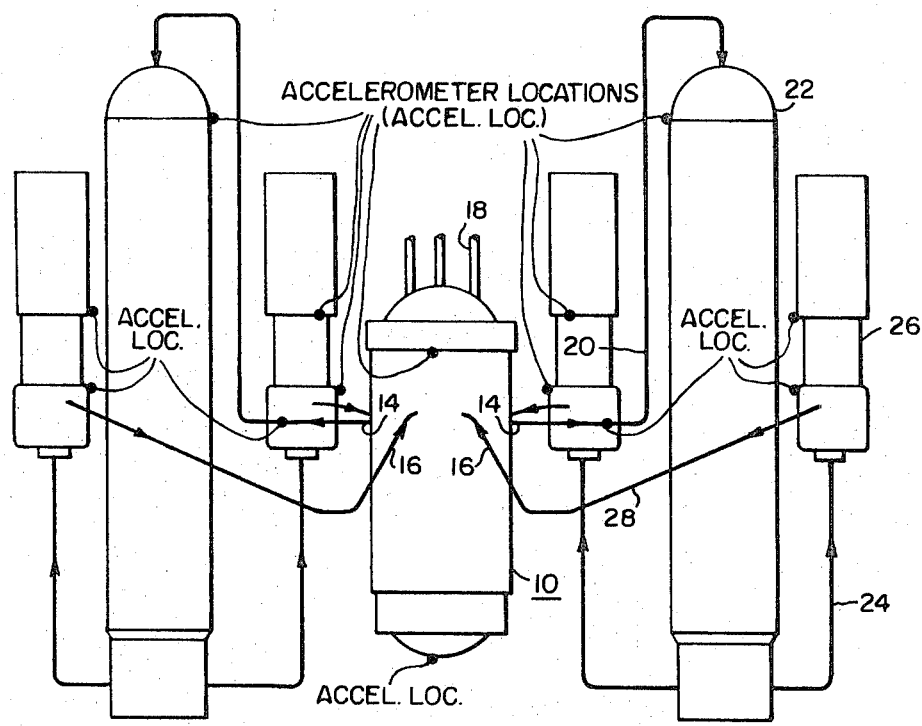
FIG. 1 is a planned view of a nuclear reactor incorporating this invention and illustrating the general location of detectors described in the exemplary embodiment.
Figure 2:
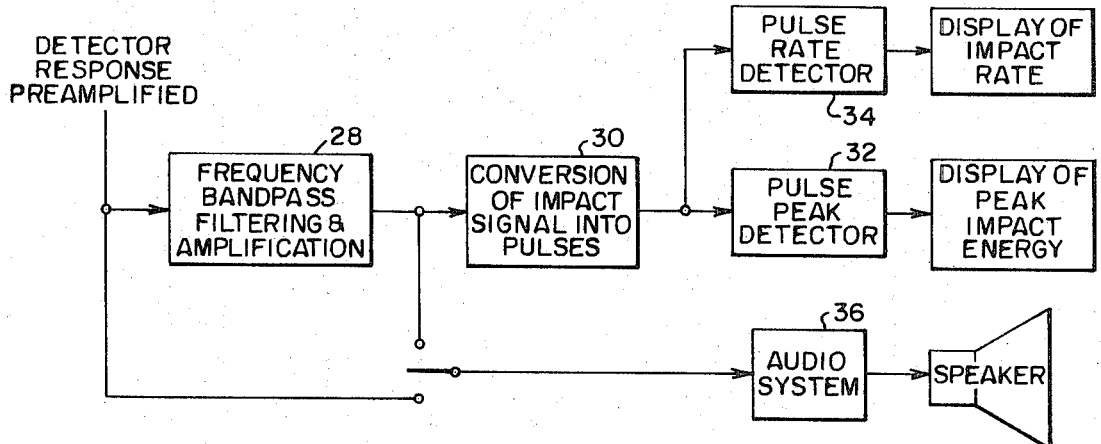
FIG. 2 is a block diagram illustrating generally one exemplary embodiment of the metal impact monitor of this invention.

One preferred embodiment contemplated by this invention, is illustrated in FIGS. 1 and 2, and provides a metal impact monitor specifically adaptable for use within the primary system of a nuclear reactor to detect the presence and continually monitor the impact rate and energy of metal debris trapped at the steam generator inlet plenum and the reactor vessel lower plenum as well as debris propelled against the reactor coolant enclosure walls. These debris, originating from the failure of primary system components, are moved by the primary coolant flow and propelled against the walls of the vessels and conduits confining the coolant. The energy imparted to the enclosure walls is continually sensed at the resonant frequency of the metal material forming the wall structure to provide an electrical output indicative thereof. The output of the sensor is processed to obtain a first and second signal respectively corresponding to the rate and energy with which impacts occur. The energy of each impact is transformed into a pulses output having an amplitude proportional to the impact energy level. A bandpass filter further refines the system to pass only those signals within the frequency range characteristic of metal impacts thus, eliminating background noise which might otherwise obscure the impact response. Additional peak detecting means, associated with the second signal, provides an indication of the maximum impact energy over a predetermined period of time. The resultant outputs are presented to the reactor plant operator, in a form he can analyze, so that he can take corrective action to prevent excessive plant damage where a component failure has occurred.

FIG. 1 shows a planned view of a nuclear reactor power generator system of the pressurized water type illustrating the relative position of the sensors employed in this exemplary embodiment for monitoring the metal impacts sustained by the primary system components confining the reactor coolant. A pressurized vessel 10 is shown which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core (not shown) consisting mainly of a plurality of clad nuclear fuel elements which generate substantial amounts of heat depending primarily upon the position of a control means, the pressure vessel housing 18 of which is shown. The heat generated by the reactor core is conveyed from the core by the coolant flow entering through inlet means 16 and exiting through outlet means 14. The flow exiting through outlet means 14 is conveyed through hot leg conduit 20 to a heat exchange steam generator 22. The steam generator 22 is of a type wherein the heated coolant flow is conveyed through tubes (not shown) which are in heat exchange relationship with the water which is utilized to produce steam. This steam produced by the generator 22 is commonly utilized to drive a turbine (not shown) for the production of electricity. The flow is conveyed from the steam generator 22 through conduit 24 to a pump 26 to inlet means 16. Thus it can be seen that a closed recycling primary or steam generating loop is provided with the coolant piping coupling the vessel 10, the steam generator 22, and the pump 26. The generating system illustrated in FIG. 1 has four such closed fluid flow systems or loops. The number of such systems can be understood to vary from plant to plant, but commonly two, three or four are employed.

An undesirable level of radioactive emission can occur in the unlikely event of a failure or rupture in the fuel rod cladding encasing the fissionable material within the reactor core, thereby increasing the potential of fission products from the fuel entering the coolant. Similarly, coolant blockage in the core, impairing the capability of the coolant to dissipate the heat produced by the nuclear core, can result in a melt down of the core structure and the release of dangerous products into the coolant. Such a condition can be the result of a structural failure within the primary system. The failure of mechanical components results in metal debris which concentrate in the steam generator inlet plenum and the bottom plenum of the reactor vessel. Such debris, suspended within the coolant, can inhibit the coolant flow path as described above.

In order to safeguard against such core structural failures so as to provide an early recognition of damaged system components this invention monitors impacts sustained by the metal walls surrounding the coolant flow path at a number of locations within the primary system. The metal impacts result from debris suspended within the coolant as a result of such system component failures.

Thus, this invention provides a mechanism for detecting and monitoring impacts produced by the bouncing of metal debris against the walls of the primary system enclosures containing the reactor coolant. In the specific exemplary embodiment illustrated in FIGS. 1, 2, 3, 4 and 5, the metal impacts are primarily monitored at the steam generator inlet plenum and the bottom plenum of the reactor vessel as well as at other conduit connecting locations around the primary system. The plenum locations are the most probable points of collection and as such are most suitable for the detection of debris. The invention provides continuous information on both the size and the amount of the debris trapped at the monitored locations.

FIG. 1 illustrates the general location of detectors employed to translate the mechanical energy imparted to the metal enclosures confining the reactor coolant, to an analogous electrical signal. Accelerometers, which are well known in the art, are employed at the indicated locations for this purpose. While accelerometers are described as the sensor of this embodiment, it should be understood that any other detector capable of translating the mechanical energy of the metal enclosures derived from metal impacts into an analogous electrical signal at the resonant frequency of the mechanical enclosures can be employed for this purpose. The sensing frequency has characteristically been found to lie within a frequency band of 2 KHz to 6 KHz for such impacts, and differs from the frequencies produced by normal loop operation.

FIG. 2 illustrates one exemplary embodiment of a schematic of an electrical circuit which can be employed to convert the characteristic frequency response of the metal impact signal to a metal impact response separate from the normal loop vibrational background. The resulting impact signals are further processed to obtain a first signal indicative of the rate at which impacts occur (independent of their impact energy) and a second signal indicative of the impact energy level (independent at the rate at which impacts occur). Both signals are displayed and recorded. They give pertinent information on the size (peak impact energy) and the amount (rate of impact) of metal debris present at the sensor locations.

Thus, referring to FIG. 2 it can be observed that the detector response produced by the accelerometers are communicated to a frequency bandpass filter which passes only the characteristic frequency response of metal impacts lying within the 2 KHz to 6 KHz range. This range is of course, dependent upon the resonant frequency of the metal being monitored and is used to provide a discrete output response in contrast to the continuous response that would be provided if the resonant frequency of the accelerometer was employed. The filtered signal from the bandpass filter 28 is then amplified and convertd to a single pulse by an integrating circuit 30. The output of the integrating circuit 30 is then proportional to the impact energy of the metal impact sensed by the transducer and can be displayed directly to provide this information to the plant operator. However, where responses of only a particular energy range are of interest, the output from the integrating circuit 30 can be fed through a pulse peak detector 32 which will provide an output only when the energy range of interest is encountered. Such pulse peak detectors are also well known in the art, and can be equipped with memory and comparator circuits to provide an output indicative of the peak energy level encountered over a predetermined period of time. The output of the integration circuit is also coupled in parallel to a pulse rate detector 34 which provides an output indicative of the rate at which impacts occur. In some applications it may be desirable to provide an audio signal to the plant operator to assist him in listening to metal impacts as they occur. For this reason, a separate parallel output is provided from the detector to an audio system 36 which can be annunciated through a speaker in the reactor control room.

Figure 3:
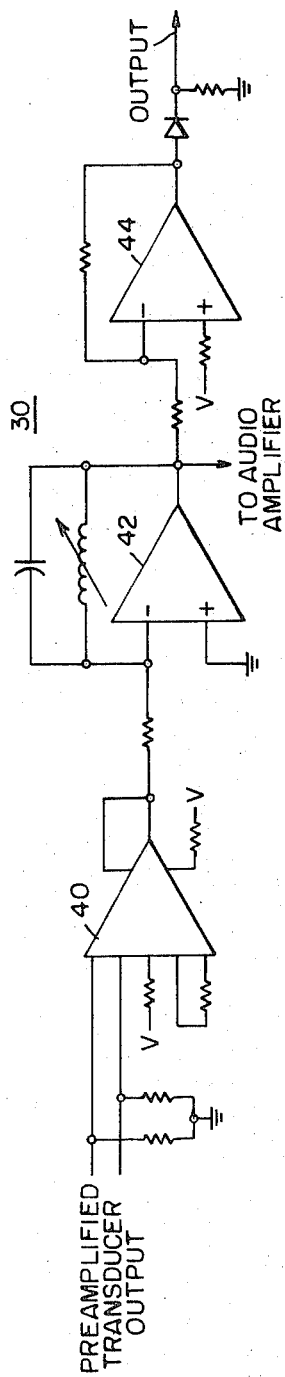
FIG. 3 is a schematic circuitry diagram of the input signal conditioning equipment comprising the filtering and pulse conversion units illustrated in FIG. 2.

The bandpass filter and pulse conversion circuit generally illustrated in FIG. 2 by reference characters 28 and 30 are more specifically shown in FIG. 3 and provides the general input signal conditioning for the signals to be applied to the pulse peak and rate detectors 32 and 34. The detector signals are first applied to an input amplifier 40 for impedance isolation and amplification. The output is then applied to a resonant amplifier 42 which provides frequency selective amplification of the input signal to increase the ratio of impact to loop response. The output of this unit can be directly applied to the audio amplifier of the audio system previously described. In addition, this output is further processed by the half wave rectifier 44 which accomplishes rectification and amplitude discrimination of the signal to eliminate remaining extraneous loop responses and provides the inputs to the pulse rate and peak detectors previously identified by reference characters 34 and 32 in FIG. 2. The remaining components are provided to supply the desired biasing and signal shaping for the components described.

Figure 4:
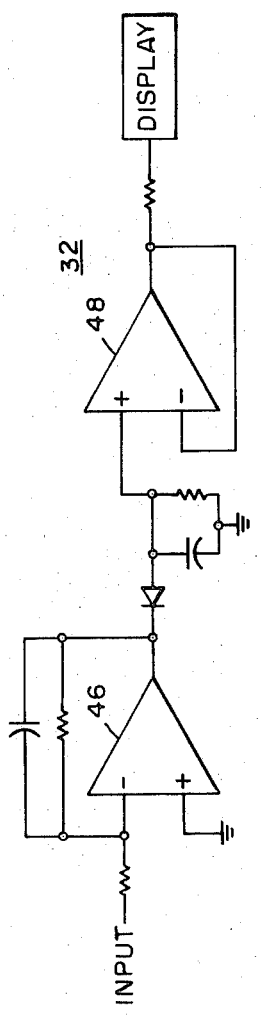
FIG. 4 is a schematic circuitry diagram of the pulse peak detector illustrated in FIG. 2.

The peak detector 32 is more specifically illustrated in FIG. 4. The output from unit 30 is applied to the input of an integrator 46 which yields the peak amplitude at its output. This output is then applied to an inverting amplifier 48 which acts as a voltage follower. The output of the inverting amplifier is then communicated to a display indicating the peak energy of the impacts sensed. The remaining components illustrated provide the desired biasing and signal shaping for the components described.

Figure 5:
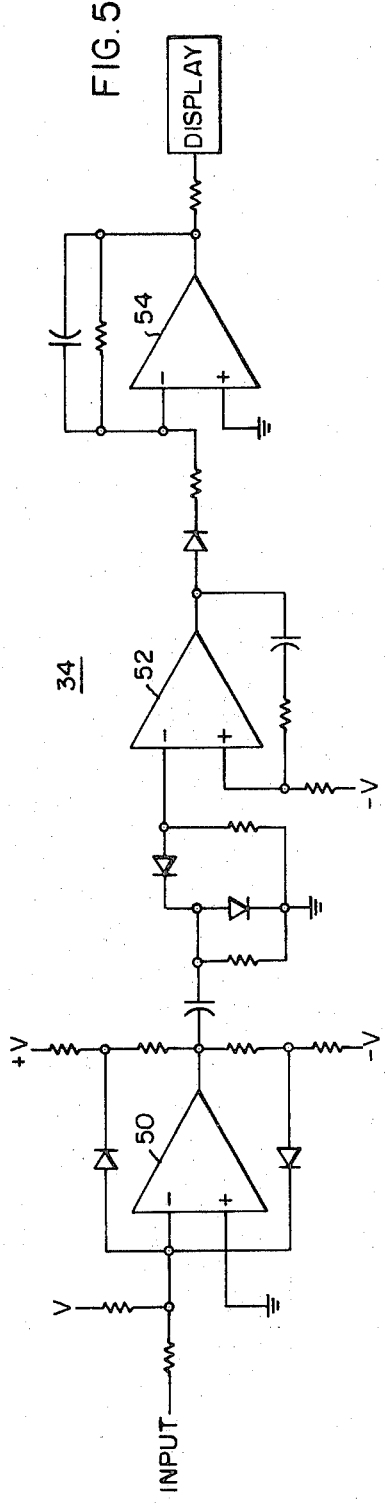
FIG. 5 is a schematic circuitry diagram of the pulse rate detector previously illustrated in FIG. 2.

The pulse rate detector 34 is more specifically illustrated in FIG. 5. The output of unit 30 is applied to a schmidt trigger 50 which processes the rectified input and provides a pulsed output which is operable to fire the one shot multivibrator 52. The output of the multivibrator 52 is supplied to an integrating circuit 54 which integrates the pulses supplied by the multivibrator into a signal proportional to the rate at which impacts occur. The output of the integrator 54 is then available for display to the reactor plant operator. The remaining components supply the desired biasing and pulse shaping for the components described analogous to that previously described.

It should be apparent, at this point, that each of the sensor outputs can be processed in a similar manner by circuits having analogous construction to that described above.

Thus, this invention provides a safeguard mechanism for monitoring the operation of mechanical systems, such as nuclear reactors, to determine when an unusual operating condition exists which might require corrective action.

We claim as our invention:

1. In combination with an apparatus operating in its intended environment, an on-line monitor for measuring impacts produced on a metal component of the apparatus during the normal operation thereof comprising:

a sensor affixedly coupled to the metal component and operable to provide an electrical output representative of the impact energy imparted to the component at the resonant frequency of the component from an extrinsic source existing within the apparatus and impacting on the component during its operation;

means associated with said sensor output for providing a first signal representative of the rate at which impacts occur; and means associated with said sensor output for providing a second signal representative of the impact energy level.

2. The monitor of claim 1 including means associated with said sensor output for filtering out background noise attributed in part to vibrations of the component encountered during operation of the apparatus.

3. The monitor of claim 1 wherein said second signal comprises a pulsed output having an amplitude proportional to the impact energy level.

4. The monitor of claim 1 including means associated with said sensor output for indicating the maximum impact energy over a predetermined period of time.

5. The monitor of claim 1 wherein the metal component comprises the external metal enclosure confining the primary coolant of a nuclear reactor steam generating system and said source comprises metal debris suspended within the primary coolant of the reactor system.

6. The monitor of claim 5 wherein said sensor includes a bandpass filter which limits the response of said sensor to a frequency band between 2 kilohertz and 6 kilohertz.

* * * * *